(12) United States Patent
Wu

(10) Patent No.: US 8,632,331 B2
(45) Date of Patent: Jan. 21, 2014

(54) STAMPING APPARATUS FOR STAMPING SHADING FILM

(75) Inventor: Cheng-Shiun Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 65 days.

(21) Appl. No.: 13/467,894

(22) Filed: May 9, 2012

(65) Prior Publication Data

US 2013/0084351 A1   Apr. 4, 2013

(30) Foreign Application Priority Data

Sep. 30, 2011   (TW) .............................. 100135400 A

(51) Int. Cl.
  *B29C 59/02*   (2006.01)
(52) U.S. Cl.
  USPC ........... 425/385; 264/219; 264/222; 425/468; 425/470; 425/403; 425/414; 425/451.9
(58) Field of Classification Search
  USPC ................. 425/193, 383, 385, 394, 403, 414, 425/183–184; 264/293, 219–222
  See application file for complete search history.

(56) References Cited

U.S. PATENT DOCUMENTS

| | | | | |
|---|---|---|---|---|
| 3,947,204 A | * | 3/1976 | Ayres et al. | 425/383 |
| 4,204,470 A | * | 5/1980 | Craighead | 101/28 |
| 6,132,652 A | * | 10/2000 | Higuchi et al. | 264/1.7 |
| 7,763,484 B2 | * | 7/2010 | Yanagisawa | 438/32 |
| 2007/0080481 A1 | * | 4/2007 | Kismarton | 264/236 |
| 2010/0196527 A1 | * | 8/2010 | Katano | 425/385 |
| 2012/0038071 A1 | * | 2/2012 | Yamashita et al. | 264/1.38 |

* cited by examiner

*Primary Examiner* — Joseph S Del Sole
*Assistant Examiner* — Nahida Sultana
(74) *Attorney, Agent, or Firm* — Altis Law Group, Inc.

(57) ABSTRACT

A stamping apparatus for stamping a shading film includes a stamping head, at least one locking member and a sleeving ring. The sleeving ring defines an axial sleeving hole and includes a stamping portion formed on a distal end thereof and surrounding the axial sleeving hole. The sleeving ring is detachably sleeved on and locked to the stamping head via the at least one locking member. The stamping portion matches with the stamping head for cooperatively stamping the shading film.

12 Claims, 6 Drawing Sheets

US 8,632,331 B2

STAMPING APPARATUS FOR STAMPING SHADING FILM

BACKGROUND

1. Technical Field

The present disclosure generally relates to stamping apparatus, and particularly to a stamping apparatus for stamping a shading film.

2. Description of Related Art

Shading films are widely applied to and assembled within lens modules for eliminating stray light and flares. The shading films are commonly manufactured by a stamping process, namely, the shading film is stamped by a stamping apparatus. However, each type of the existing stamping apparatus can only stamp one corresponding specific type of the shading film, such that, the cost to manufacture the shading films is high.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

Figure 1:
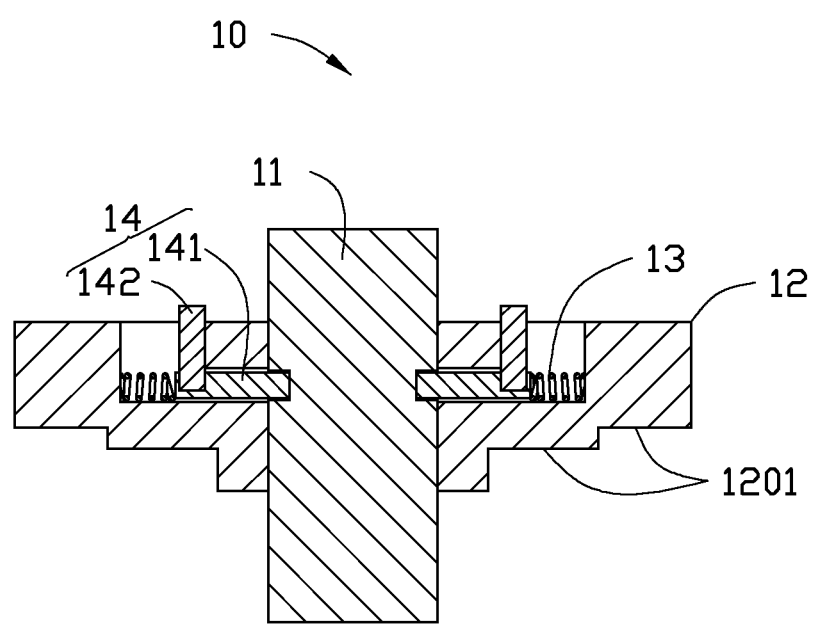
FIG. 1 shows a schematic view of a first embodiment of a stamping apparatus for stamping a shading film in a stamping state, wherein, the stamping apparatus includes a stamping head, a sleeving ring, a pair of elastic members, and a pair of locking members, the sleeving ring is fixedly sleeved on the stamping head via the pair of locking members.
Figure 2:
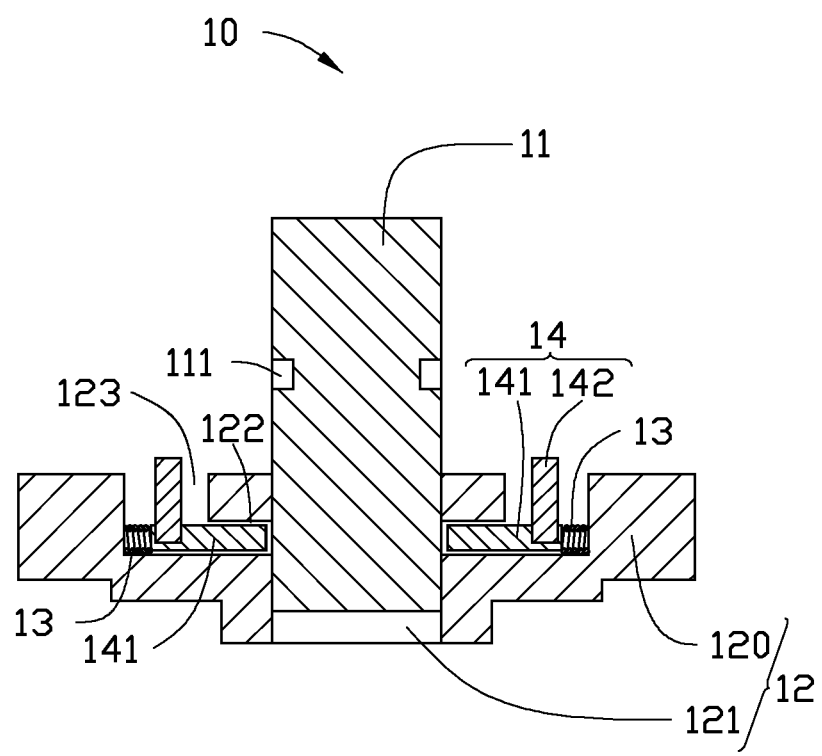
FIG. 2 shows a schematic view of the first embodiment of the stamping apparatus in an un-stamping state, wherein, the sleeving ring is detached from the stamping head.
Figure 3:
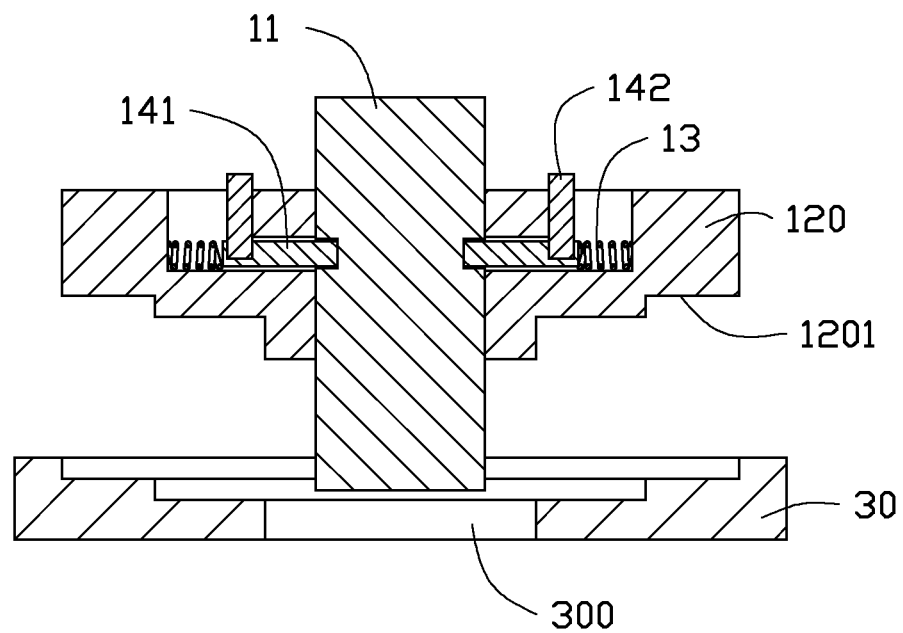
FIG. 3 is similar to FIG. 1, shows a schematic view of the first embodiment of the stamping apparatus for stamping a first shading film in a stamping process.

FIGS. 1 through 3 show a first embodiment of a stamping apparatus 10 for stamping a first shading film 30 having a substantially step-shaped first center hole 300. The stamping apparatus 10 includes a stamping head 11, a sleeving ring 12, a pair of elastic members 13 and a pair of locking members 14. The sleeving ring 12 is detachably sleeved on and locked to the stamping head 11 via the pair of elastic members 12 and the pair of locking members 14. As in use, the stamping apparatus 10 is capable of stamping different types of shading films by replacing different structures and types of sleeving rings 12.

The stamping head 11 is substantially cylindrical. Two blind holes 111 are symmetrically defined in a periphery wall of one end of the stamping head 11, radially. It is to be noted that, the number of blind holes 111 is not limited to two, it depends on an actual need. Namely, the number of blind holes can be one, three, four, or other numbers. The blind holes 111 are evenly disposed along a circumferential direction of one end of the stamping head 11.

The sleeving ring 12 includes a main body 120 and an axial sleeving hole 121 defined through a substantially central portion of the main body 120. An inner diameter of the axial sleeving hole 121 of the sleeving ring 12 matches with an outer diameter of the corresponding stamping head 11, such that, the sleeving ring 12 sleeves on the stamping head 11 correspondingly. The main body 120 further defines two radial locking holes 122 and two axial holes 123 respectively communicating with the two radial locking holes 122. The two radial locking holes 122 are oppositely and symmetrically defined in the main body 120. One end of each radial locking hole 122 communicates with the axial sleeving hole 121, an opposite end of each radial locking hole 122 communicates with one corresponding axial hole 123. The two axial holes 123 are symmetrically defined in one end of the main body 120 corresponding to the pair of blind holes 111 of the stamping head 11, and are positioned parallel to the axial sleeving hole 121, and further communicate with the corresponding two radial locking holes 122.

The other end of the main body 120 is substantially stepped shaft shaped, and has a step-shaped stamping portion 1201 surrounding the axial sleeving hole 121. The step-shaped stamping portion 1201 matches with the stamping head 11 thereby cooperatively stamping the first shading film 30 to form the step-shaped first center hole 300. The numbers of the radial locking holes 122 and the axial holes 123 are not limited to two, they depend on an actual need. Namely, the numbers of the radial locking holes 122 and the axial holes 123 can respectively be one, three, four, or any other number.

The locking member 14 includes a traverse locking tenon 141 and a longitudinal locking tenon 142 perpendicularly fixed to one end of the traverse locking tenon 141. In the illustrated embodiment, the traverse locking tenon 141 and the longitudinal locking tenon 142 are both cylindrical and screwed together. The traverse locking tenon 141 is positioned within the corresponding radial locking hole 122 of the sleeving ring 12 and has a length longer than the length of the radial locking hole 122. The longitudinal locking tenon 142 is assembled within the corresponding axial hole 123 of the sleeving ring 12 and has a length larger than the length of the axial hole 123. In addition, a diameter of the longitudinal tenon 142 is less than that of the axial hole 123, such that, the longitudinal tenon 142 is capable of being operated and moved within the axial hole 123 radially along a direction parallel to the radial locking hole 122, together with the traverse locking tenon 141.

The pair of elastic members 13 are respectively assembled within the pair of axial holes 123 and elastically resist against the corresponding locking member 14. In the illustrated embodiment, one end of each elastic member 13 is fixed to an inner wall of the axial hole 123, the other end is fixed to the corresponding locking member 14, such that, the traverse locking tenon 141 of the locking member 14 is capable of moving within the radial locking hole 122 under an elastic force generated by the corresponding elastic member 13.

When assembling the stamping apparatus 10, the locking members 14 are first assembled to the sleeving ring 12 together with the corresponding elastic members 13. The stamping head 11 is aligned with and inserted into the axial sleeving hole 121 of the sleeving ring 12, away from the step-shaped stamping portion 1201 end of the sleeving ring 12. The two locking members 14 are pushed away from the axial sleeving hole 121 of the sleeving ring 12 thereby facilitating the stamping head 11 passing through the axial sleeving hole 121 of the sleeving ring 12. Meanwhile, the elastic members 13 are compressed to accumulate elastic force. When the blind holes 111 of the stamping head 11 align with the corresponding radial locking holes 122 of the sleeving ring 12, the traverse locking tenons 141 of the locking members 14 are released and latch into the corresponding blind holes 111 of the stamping head 11, under the elastic force generated by the elastic members 13, such that, the sleeving ring 12 is tightly mounted to the stamping head 11 to finished the assembly of the stamping apparatus 10.

During a stamping process, the assembled stamping apparatus 10 is assembled to a driver (not shown) to stamp the pre-stamped shading film 30. The sleeving ring 12 is capable of being detached from the stamping head 11 quickly, after a stamping process, by pushing the corresponding locking members 14 away from the axial sleeving hole 121 of the sleeving ring 12, replaces other sleeving rings 12 or cleans the sleeving ring 12 and the stamping head 11.

Figure 4:
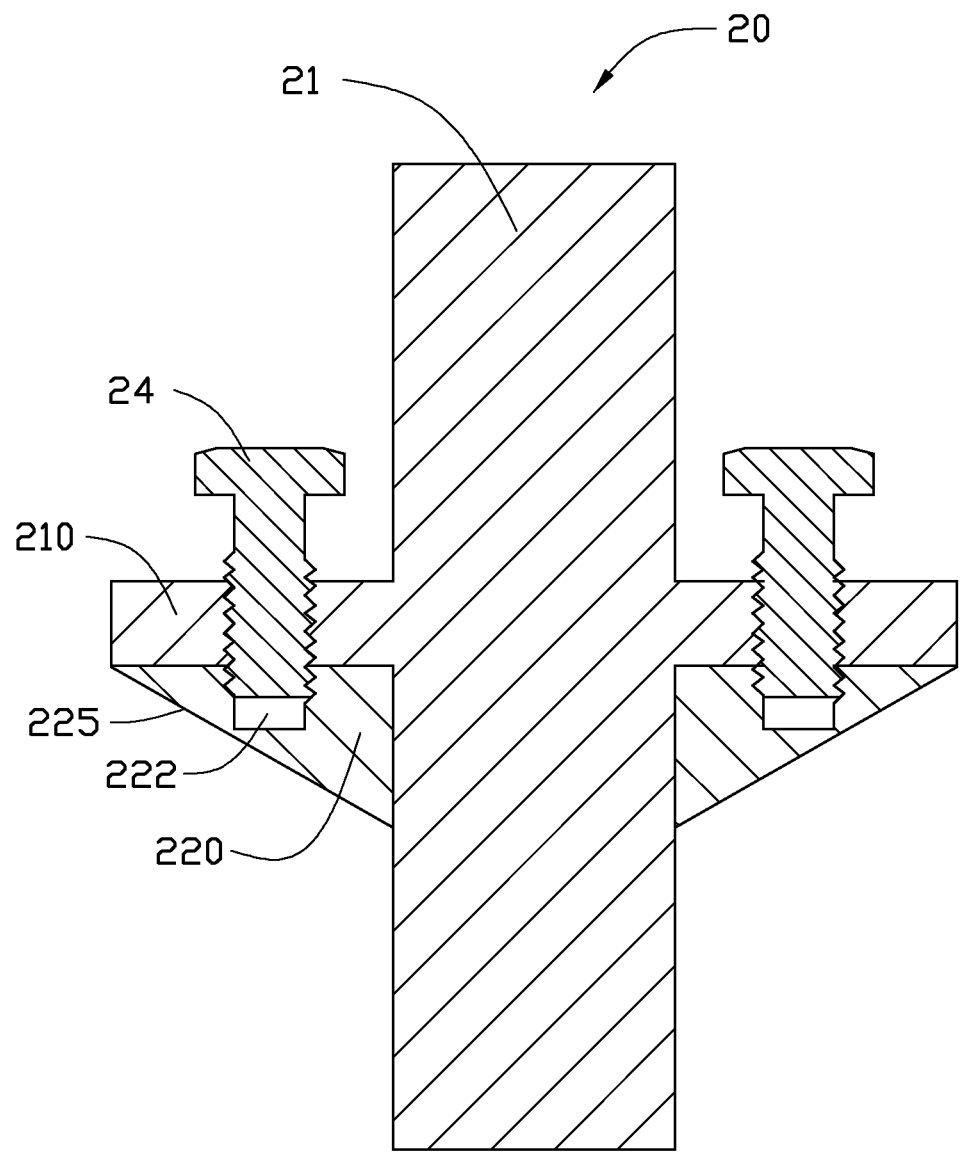
FIG. 4 shows a schematic view of a second embodiment of the stamping apparatus in a stamping state, wherein, the sleeving ring is fixedly sleeved on the stamping head.
Figure 5:
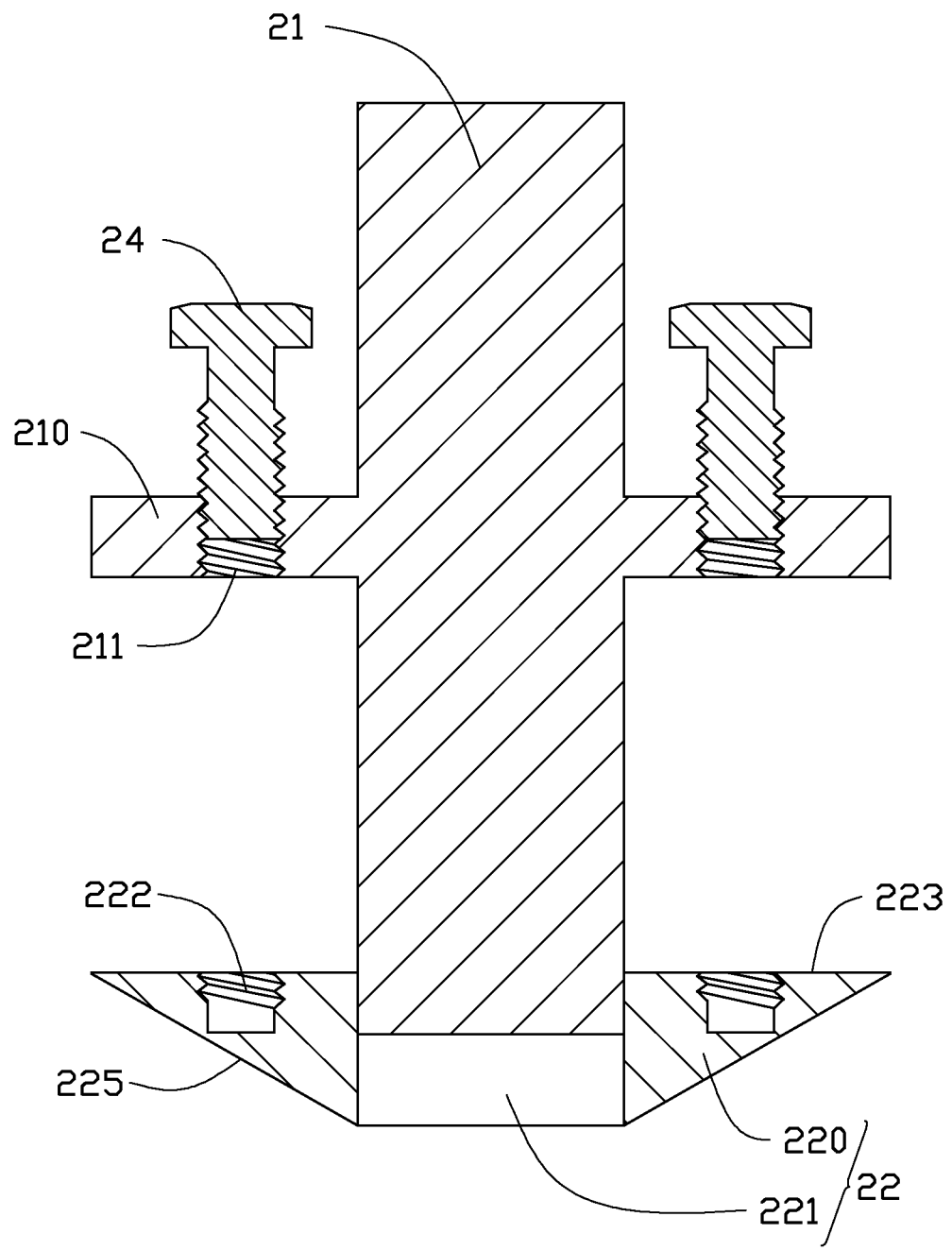
FIG. 5 shows a schematic view of a second embodiment of the stamping apparatus in an un-stamping state, wherein, the sleeving ring is detached from the stamping head.
Figure 6:
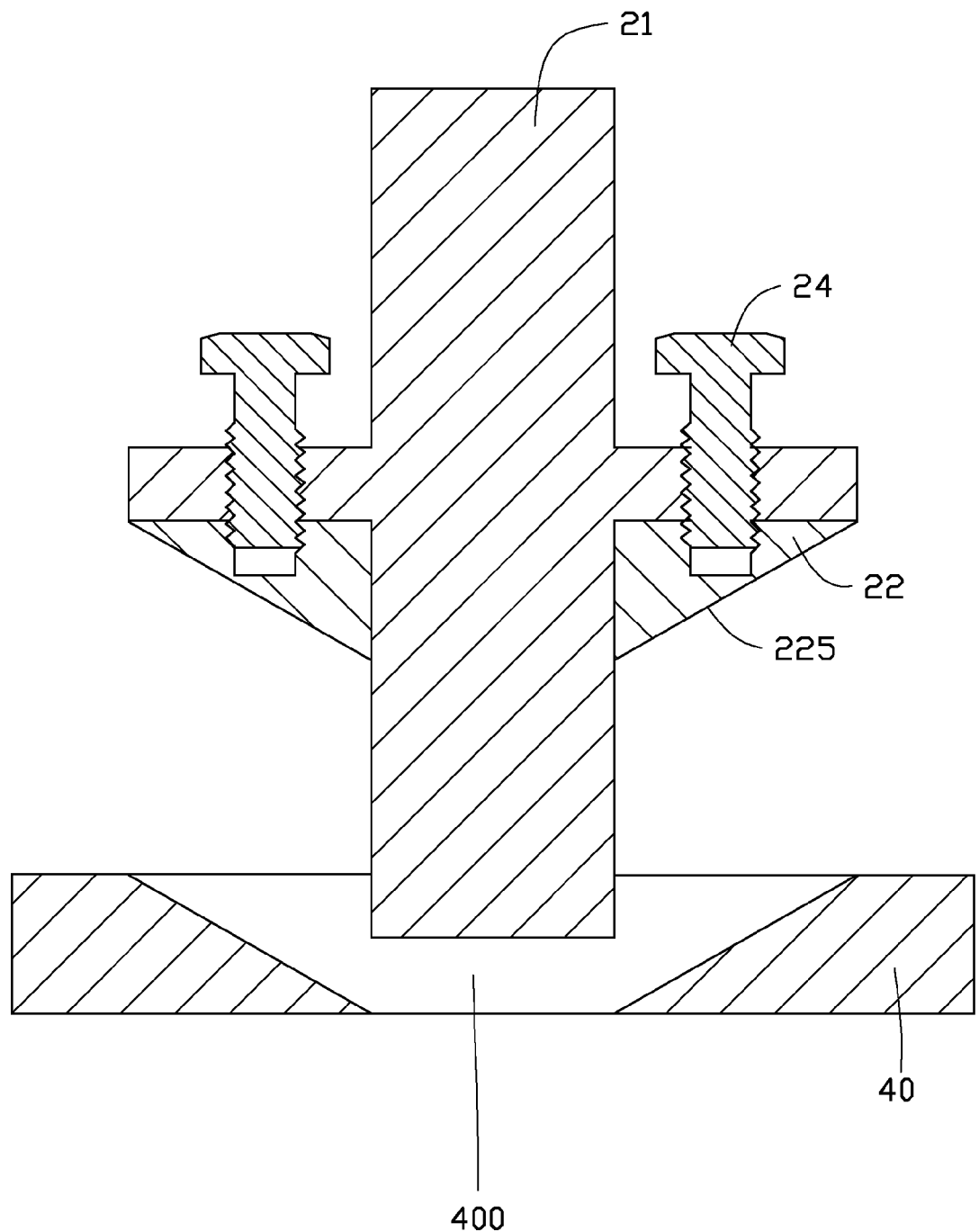
FIG. 6 is similar to FIG. 4, shows a schematic view of the second embodiment of the stamping apparatus for stamping a second shading film in a stamping process.

FIGS. 4 through 6, show a second embodiment of a stamping apparatus 20 for stamping a second shading film 40 having a second center hole 400. In the illustrated embodiment, the second center hole 400 has a substantially isosceles trapezoid cross section. The stamping apparatus 20 includes a stamping head 21, a sleeving ring 22, and a pair of locking members 24. The sleeving ring 22 is detachably sleeved on the stamping head 21 via the pair of locking members 24. In the illustrated embodiment, the locking member 24 is a bolt.

The stamping head 21 is substantially cylindrical, and includes a ring-shaped flange 210 formed on a periphery wall and coaxially positioned adjacent to one end of the stamping head 21. Two first screw holes 211 are symmetrically defined through the flange 210, and positioned at two sides of the stamping head 21. The number of the first screw holes 211 is not limited to the two, it depends on the actual need. Namely, the number of the screw holes can be one, three, four, or any other number. The first screw holes 211 are evenly defined through the flange 210 and surround the stamping head 21 circumferentially.

The sleeving ring 22 has a substantially isosceles trapezoid cross-section, and includes a main body 220 defining an axial sleeving hole 221. The main body 220 includes a connecting end surface 223 and a slantwise stamping surface 225. The axial sleeving hole 221 is defined through the substantially central portion of the connecting end surface 223. Two second screw holes 222 are symmetrically defined in the connecting end surface 223 of the main body 220 and positioned at two sides of the axial sleeving hole 221, corresponding to the pair of first screw holes 211 of the flange 210 of the stamping head 21. The number of the second screw holes 222 is not limited to two, it depends on an actual need. Namely, the number of the second screw holes 222 can be one, three, four, or the other numbers. The slantwise stamping surface 225 may be a roughened surface defining a plurality of sawteeth structures.

When assembling the stamping apparatus 20, the sleeving ring 22 is first sleeved on the stamping head 21, the connecting end surface 223 of the sleeving ring 22 contacts and resists against the flange 210 of the stamping head 21. The first screw holes 211 of the flange 210 align with the corresponding second screw holes 222 of the sleeving ring 22. The locking members 24 pass through the corresponding first screw holes 211 of the flange 210 and are finally screwed into the corresponding second screw holes 222 of the sleeving ring 22, to finish the assembly of the stamping apparatus 20. The sleeving ring 22 is capable of being detached from the stamping head 21 quickly, and replaced with other types of sleeving rings 22 to stamp different types of shading films.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A stamping apparatus for stamping a shading film, comprising:
a stamping head being substantially cylindrical and has at least one blind hole defined in a periphery wall of one end of the stamping head radially;
at least one locking member comprising a traverse locking tenon and a longitudinal locking tenon fixed to one end of the traverse locking tenon;
a sleeving ring defining an axial sleeving hole, at least one radial locking hole, and at least one axial hole, the at least one radial locking hole communicating with the axial sleeving hole, the at least one axial hole communicating with the at least one radial locking hole; the sleeving ring comprising a stamping portion formed on a distal end thereof and surrounding the axial sleeving hole, wherein the at least one locking member is releasably assembled within the at least one radial locking hole of the sleeving ring and engages into the corresponding at least one blind hole of the stamping head, thereby locking the sleeving ring to the stamping head; the stamping portion matches with the stamping head for cooperatively stamping the shading film; and
an elastic member, wherein the locking member is releasably assembled within the radial locking hole via the elastic member, the traverse locking tenon and the longitudinal locking tenon are respectively received within the radial locking hole and the axial hole of the sleeving ring, and the elastic member is received within the radial locking hole and resists against traverse locking tenon of the locking member.

2. The stamping apparatus of claim 1, wherein the stamping portion of the sleeving ring is substantially stepped shaft shaped.

3. The stamping apparatus of claim 1, wherein the traverse locking tenon has a length larger than a length of the radial hole, the longitudinal locking tenon has a length larger than a length of the axial hole, and a diameter of the longitudinal tenon is less than that of the axial hole, such that, the longitudinal tenon is capable of being operated and moving within the axial hole radially along a direction parallel to the radial locking hole, together with the traverse locking tenon.

4. The stamping apparatus of claim 1, wherein two ends of the elastic member are respectively fixed to an inner wall of the axial hole and the corresponding locking member.

5. The stamping apparatus of claim 1, wherein the stamping head comprises a ring-shaped flange coaxially formed adjacent to one end thereof, and at least one first screw holes defined through the flange; the sleeving ring further comprises a connecting end surface and defines at least one second screw hole in the connecting end surface of the sleeving ring, corresponding to the at least one first screw hole of the flange; the locking member is a bolt passing through the first screw hole and screwed into second screw hole of the sleeving hole.

6. The stamping apparatus of claim 5, wherein the sleeving ring has a substantially isosceles trapezoid cross-section and comprises a slantwise stamping surface.

7. The stamping apparatus of claim 5, wherein the slantwise stamping surface is a roughened surface.

8. A stamping apparatus for stamping a shading film, comprising:

a stamping head being substantially cylindrical and comprises a pair of blind holes, and a pair of radial locking holes, the blind holes being symmetrically defined in a periphery wall of one end of the stamping head radially;

a pair of locking members comprising a traverse locking tenon and a longitudinal locking tenon fixed to one end of the traverse locking tenon;

a sleeving ring defining an axial sleeving hole, a pair of radial locking holes, and a pair of axial holes, the pair of radial locking holes communicating with the axial sleeving hole, and the pair of axial holes communicating with the pair of radial locking holes, the sleeving ring comprising a stamping portion formed on a distal end thereof and surrounding the axial sleeving hole, wherein the at least one locking member is releasably assembled within the at least one radial locking hole of the sleeving ring and engages into the corresponding at least one blind hole of the stamping head, thereby locking the sleeving ring to the stamping head, the pair of locking members are symmetrically positioned at two sides of stamping head, the stamping portion matches with the stamping head for cooperatively stamping the shading film; and a pair of elastic members, wherein the pair of lock members is releasably assembled within the radial locking holes via the elastic members, the traverse locking tenon and the longitudinal locking tenon are respectively received within the corresponding radial locking hole and the axial hole of the sleeving ring, the elastic member is received within the radial locking hole and resists against traverse locking tenon of the locking member.

9. The stamping apparatus of claim 8, wherein the stamping portion of the sleeving ring is substantially stepped shaft shaped.

10. The stamping apparatus of claim 8, wherein the traverse locking tenon has a length larger than a length of the radial locking hole, the longitudinal locking tenon has a length larger than a length of the axial hole, and a diameter of the longitudinal tenon is less than that of the axial hole, such that, the longitudinal tenon is capable of being operated and moving within the axial hole radially along a direction parallel to the radial locking hole, together with the traverse locking tenon.

11. The stamping apparatus of claim 8, wherein two ends of the elastic member are respectively fixed to an inner wall of the axial hole and the locking member.

12. The stamping apparatus of claim 8, wherein the stamping head comprises a ring-shaped flange coaxially formed adjacent to one end thereof, and a pair of first screw holes symmetrically defined through the flange; the sleeving ring further comprises a connecting end surface and defines a pair of second screw holes in the connecting end surface of the sleeving ring, symmetrically corresponding to the pair of first screw holes of the flange; the locking member is a bolt passing through corresponding first screw holes and screwed into corresponding second screw holes of the sleeving hole.

* * * * *